Dec. 22, 1925.

A. J. McKINLEY 1,566,494

BELT TIGHTENER

Filed July 18, 1921

WITNESS
A.E. Alberg

INVENTOR
A.J. McKINLEY
BY
White Prost Evans
his ATTORNEYS

Patented Dec. 22, 1925.

1,566,494

UNITED STATES PATENT OFFICE.

ARTHUR JACK McKINLEY, OF SAN FRANCISCO, CALIFORNIA, ASSIGNOR TO THE WESTERN STATES MACHINE COMPANY, OF SALT LAKE CITY, UTAH, A CORPORATION OF UTAH.

BELT TIGHTENER.

Application filed July 18, 1921. Serial No. 485,725.

*To all whom it may concern:*

Be it known that I, ARTHUR J. McKINLEY, a citizen of the United States, and a resident of the city and county of San Francisco, State of California, have invented a new and useful Belt Tightener, of which the following is a specification.

This invention relates to power transmitting apparatus and more particularly to means for automatically and constantly controlling the tension of an endless belt and especially belts having a quarter twist in their circuit.

It is an object of the present invention to provide an improved belt tightener provided with automatically acting, yieldable means for maintaining a desired degree of tension in a driving belt.

It is a further object of the invention to provide a device of this kind which may be readily adapted to standard organizations with but a small degree of change in an organization, either in original construction of the same or while being installed or after installation.

It is, further, an object to provide a take-up or tightener attachment that can be applied with a minimum degree of cost and at small loss of time.

The invention possesses other objects and features of advantage, some of which with the foregoing, will be made manifest in the following description of the preferred form of the invention, which is illustrated in the drawings accompanying and forming part of the specification. It is to be understood that it is not intended to limit the invention to the embodiment shown by the said drawings and descriptions, as variations may be adopted within the scope of the inventions as set forth in the claims.

Figure 1:
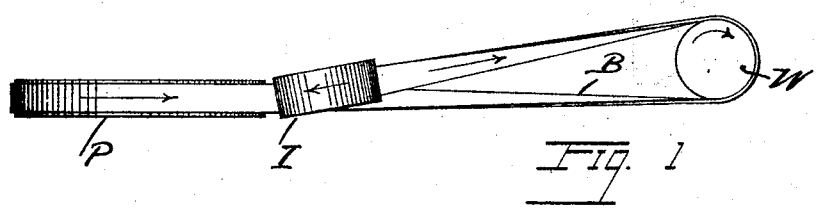
Figure 1 illustrates a belt of the quarter turn type in which the invention is shown as utilized.
Figure 2:
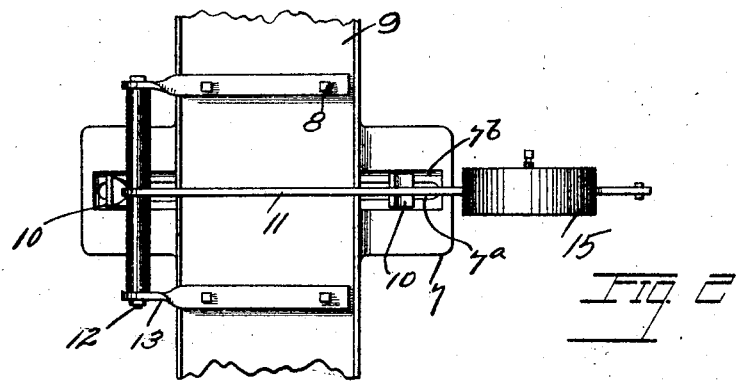
Fig. 2 is a plan view of an installation omitting the belt.
Figure 3:
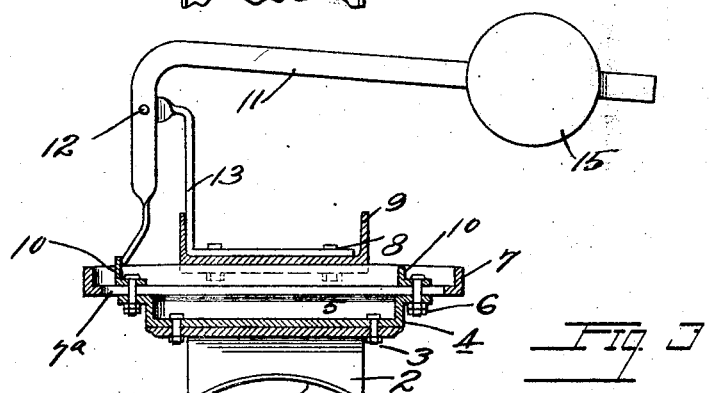
Fig. 3 is a side elevation of Fig. 2; a part of the belt being indicated in dotted lines.

It is especially desirable in the operation of high speed machinery such, for instance, as sugar centrifugals to provide means for constantly and yieldingly maintaining a substantially uniform degree of tension in an endless driving belt. In the installation and operation of sugar centrifugals a heavy belt is employed running between a driving motor or other agent and a driving pulley on the shaft of the centrifugal machine and ordinarily, in order to secure a high degree of friction and driving efficiency, an idler is rigidly mounted contiguous to the driving wheel of the centrifugal so as to increase the length of the bight of the belt encompassing the pulley being driven. Owing to the rigid installation of the idler, rapid wear and deterioration of the belt is caused because of the variations in tension incident to operation.

The device of the present invention is designed to utilize, as far as practicable, the standard equipments, as, for instance, in sugar mill centrifugals, but at the same time, materially improve the efficiency and life of the apparatus by yieldingly mounting the tension idler.

In the illustrated form of the invention, a quarter twist belt B is shown as being driven by a motor pulley wheel W from which the belt leads to a master pulley P on a centrifugal machine shaft. Disposed to one side of the pulley P is an idler I, ordinarily rigidly mounted.

In the present invention the idler I, is mounted in a suspending bearing 2 bolted as at 3, to a slide 4, having a sunken portion 5 in which the heads of the bolts 3 are arranged. The slide 4, has at opposite ends, bolts 6, which pass through the end flanges of the slide, which flanges bear against the finished bottom of a bracket or frame 7, that is bolted or otherwise secured as at 8, to a structural frame part of the mill, as a channel iron 9.

The frame 7 is shown as provided with a central longitudinal slot $7^a$ through which pass the shanks of the bolts 6 whose heads engage shoes 10, sliding in the widened upper portion $7^b$ of the frame 7. From this it will be seen that the hanger 2, which is rigidly secured to the slide 7, can be shifted in a line at right angles to the shaft of the idler pulley I and at the same time the shoes 10 will shift in their guideways $7^b$.

For the purpose of automatically controlling the shifting of the idler I and maintaining a substantially uniform tension in the belt B, a suitable means is utilized, which in the present case is shown as in the form of a belt crank or L-shaped lever 11, having a vertical arm fulcrumed on a pivot or rocker rod 12, which may be mounted in the ends of a pair of bracket arms 13, which are secured in the present case by the bolts 8 to the top of the structural frame or channel-iron 9. The longer and horizontally extending arm of the lever 11 is provided with means acting normally to pull the arm downwardly and thrust the toe 11ª of the lever against the upwardly extending contiguous shoe 10. The actuating means in the present case is shown as a weight 15.

From the above it will be seen that the slide 4 is adapted to shift to and fro according to variations in the action of the belt B, running over the idler I, and the belt is placed substantially under a constant and given pressure by means of the weighted lever arm 11, which tends to shift the slide 4 and thrust the idler toward the adjacent side of the machine pulley P.

In this disclosure of the invention, the frame 7, the slide 4 with the hanger and the pulley are all of well known and extensively used form and to these are readily applied the shifting lever 4 with the shoes 10 and their respective bolts 6. Therefore, but little change is made in the construction of the usual equipment.

What is claimed is:

1. A belt tightening device including, in combination, a fixed frame provided with guideways, a hanger for the idler, shoes operating in the guideways and to which the hanger is attached so as to be slidable on said frame and suspended therebelow, and means mounted on and above the frame and operative to constantly force the hanger in one direction along the guideways of the frame to maintain the belt in tightened condition; said means including a yieldingly operative arm engaging one of the shoes.

2. A belt tightening device including, in combination, a fixed frame provided with guideways, a hanger arranged under the frame for the idler, shoes operating in the guideways and to which the hanger is attached so as to be slidable along said frame, and means operative to constantly force the hanger in one direction along the guideways of the frame to maintain the belt in tightened condition; said means including a bell crank lever pivoted on and above the frame and having one end engaging one of the shoes and yieldingly operative to press against the shoe.

3. A belt tightening device including, in combination, a fixed frame provided with guideways, a hanger for the idler, shoes operating in the guideways and to which the hanger is attached so as to be slidable along and below said frame, and means above the frame, operative to constantly force the hanger in one direction along the guideways of the frame to maintain the belt in tightened condition; said means including a bell crank lever having one end engaging one of the shoes and yieldingly operative to press against the shoe, and an adjustable weight on one arm of the lever to effectuate the yielding action.

In testimony whereof, I have hereunto set my hand.

ARTHUR JACK McKINLEY.